US012742424B2

(12) United States Patent
Lepretre et al.

(10) Patent No.: US 12,742,424 B2
(45) Date of Patent: Sep. 22, 2026

(54) METHOD AND UNIT FOR CONTROLLING A MOTOR ASSEMBLY

(71) Applicant: SAFRAN AIRCRAFT ENGINES, Paris (FR)

(72) Inventors: Jean-Baptiste Etienne Bernard Lepretre, Moissy-Cramayel (FR); Baptiste Jean-Marie Renault, Moissy-Cramayel (FR); Seif Eddine Benattia, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/846,550

(22) PCT Filed: Mar. 14, 2023

(86) PCT No.: PCT/FR2023/050341
§ 371 (c)(1),
(2) Date: Sep. 12, 2024

(87) PCT Pub. No.: WO2023/175270
PCT Pub. Date: Sep. 21, 2023

(65) Prior Publication Data

US 2025/0188867 A1 Jun. 12, 2025

(30) Foreign Application Priority Data

Mar. 15, 2022 (FR) ........................................ 2202270

(51) Int. Cl.
*F02C 9/00* (2006.01)
*F01D 15/10* (2006.01)
(Continued)

(52) U.S. Cl.
CPC ................ *F02C 9/00* (2013.01); *F01D 15/10* (2013.01); *F02C 6/14* (2013.01); *F02C 7/32* (2013.01); *F02C 7/36* (2013.01)

(58) Field of Classification Search
CPC .. F02C 6/14; F02C 7/268; F02C 7/275; F02C 7/32; F02C 7/36; F02C 9/00; F01D 15/10
See application file for complete search history.

(56) References Cited

U.S. PATENT DOCUMENTS 9,853,581 B2 * 12/2017 Armstrong .............. F01D 21/14
10,718,271 B2 * 7/2020 Kupratis ................ F01D 15/10
(Continued)

FOREIGN PATENT DOCUMENTS

EP 2989007 A1 3/2016
EP 3569855 A1 11/2019
FR 3004701 A1 10/2014

OTHER PUBLICATIONS

Search Report and Written Opinion issued in International Application No. PCT/FR2023/050341, mailed Sep. 21, 2023.
(Continued)

*Primary Examiner* — Kyle Robert Thomas
(74) *Attorney, Agent, or Firm* — Bookoff McAndrews, PLLC

(57) ABSTRACT

A method for controlling a motor assembly. The motor assembly includes a gas turbine engine and at least one electric machine which is mechanically coupled to a rotating shaft of the gas turbine engine so as to be rotated for generating electricity. In this control method, a mechanical power take-off setpoint by the electric machine is changed when an operating parameter of the gas turbine engine reaches a predetermined limit. A control unit adapted to perform this method, a motor assembly incorporating this
(Continued)

control unit, the electric machine and the gas turbine engine, and a computer program for performing this method.

12 Claims, 3 Drawing Sheets

(51) Int. Cl.

| | |
|---|---|
| ***F02C 6/14*** | (2006.01) |
| ***F02C 7/32*** | (2006.01) |
| ***F02C 7/36*** | (2006.01) |

(56) References Cited

U.S. PATENT DOCUMENTS

| | | | | |
|---|---|---|---|---|
| 10,762,726 | B2 * | 9/2020 | Gansler | B64D 35/024 |
| 10,961,921 | B2 * | 3/2021 | Tang | F02C 9/58 |
| 2015/0128597 | A1 * | 5/2015 | Schlak | B64D 31/00<br>60/719 |
| 2015/0251766 | A1 * | 9/2015 | Atkey | B64D 13/08<br>60/785 |
| 2015/0330869 | A1 * | 11/2015 | Ziarno | G01M 15/14<br>701/34.4 |
| 2016/0076461 | A1 * | 3/2016 | Kawai | B64D 37/30<br>60/39.463 |
| 2019/0112049 | A1 * | 4/2019 | Phan | B64U 10/16 |
| 2022/0065176 | A1 | 3/2022 | Schober et al. | |

OTHER PUBLICATIONS

Search Report issued in corresponding French Application No. 2202270, mailed Nov. 16, 2022.

* cited by examiner

[Fig. 1]
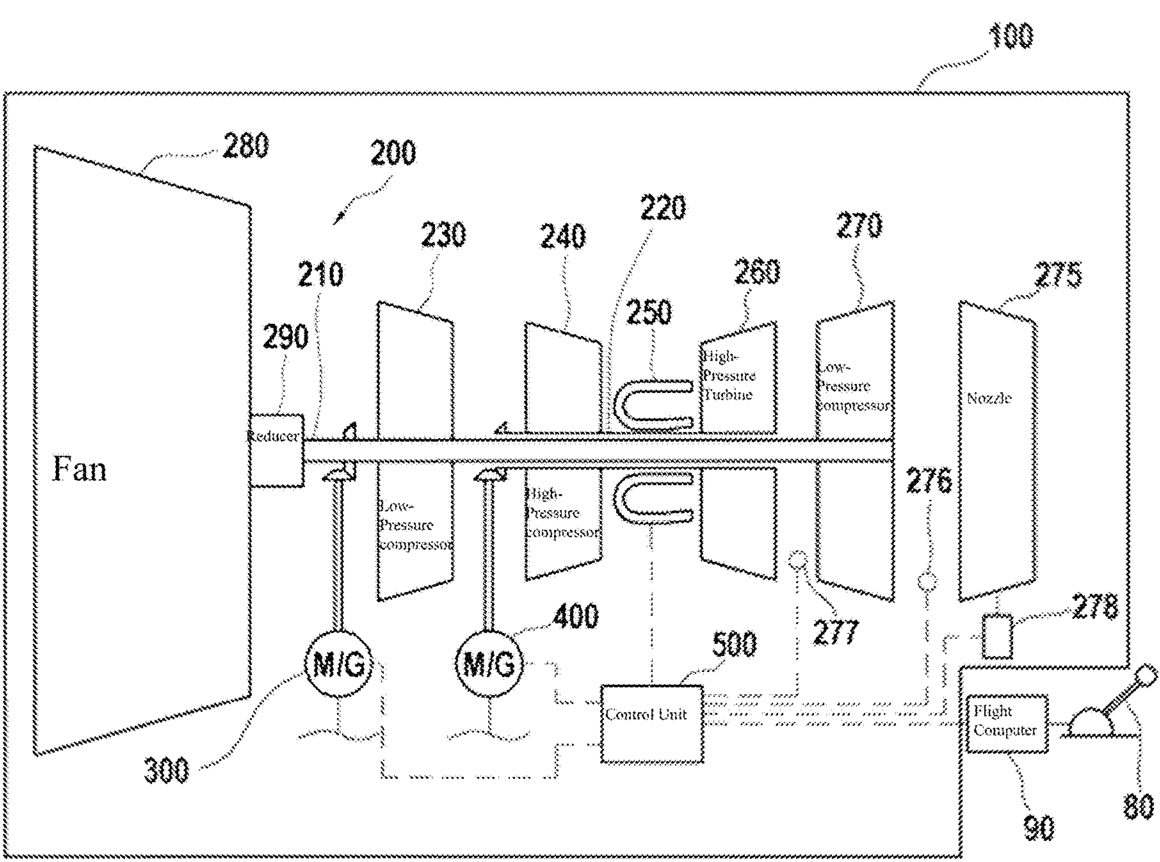

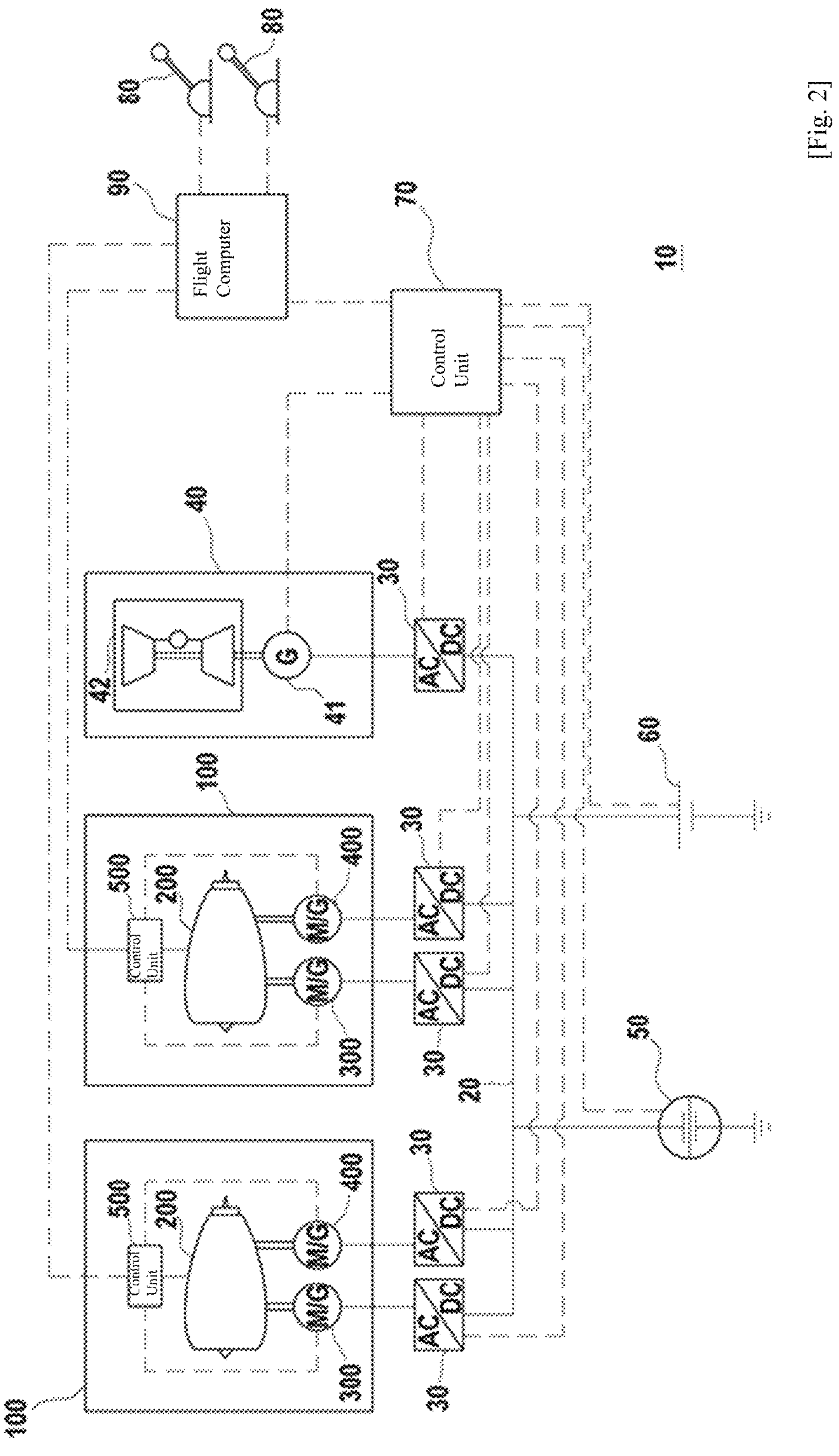
[Fig. 2]

[Fig. 3]
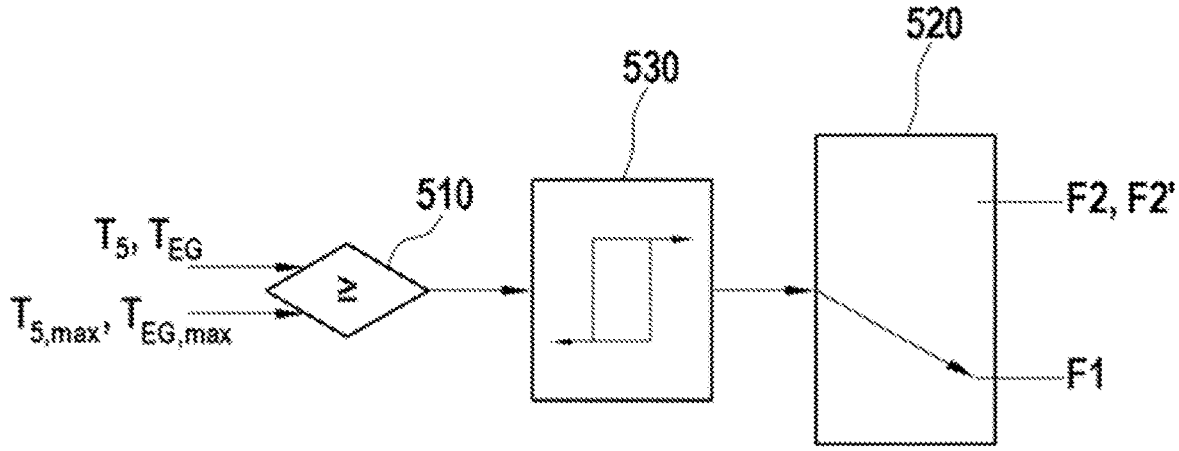
[Fig. 4]
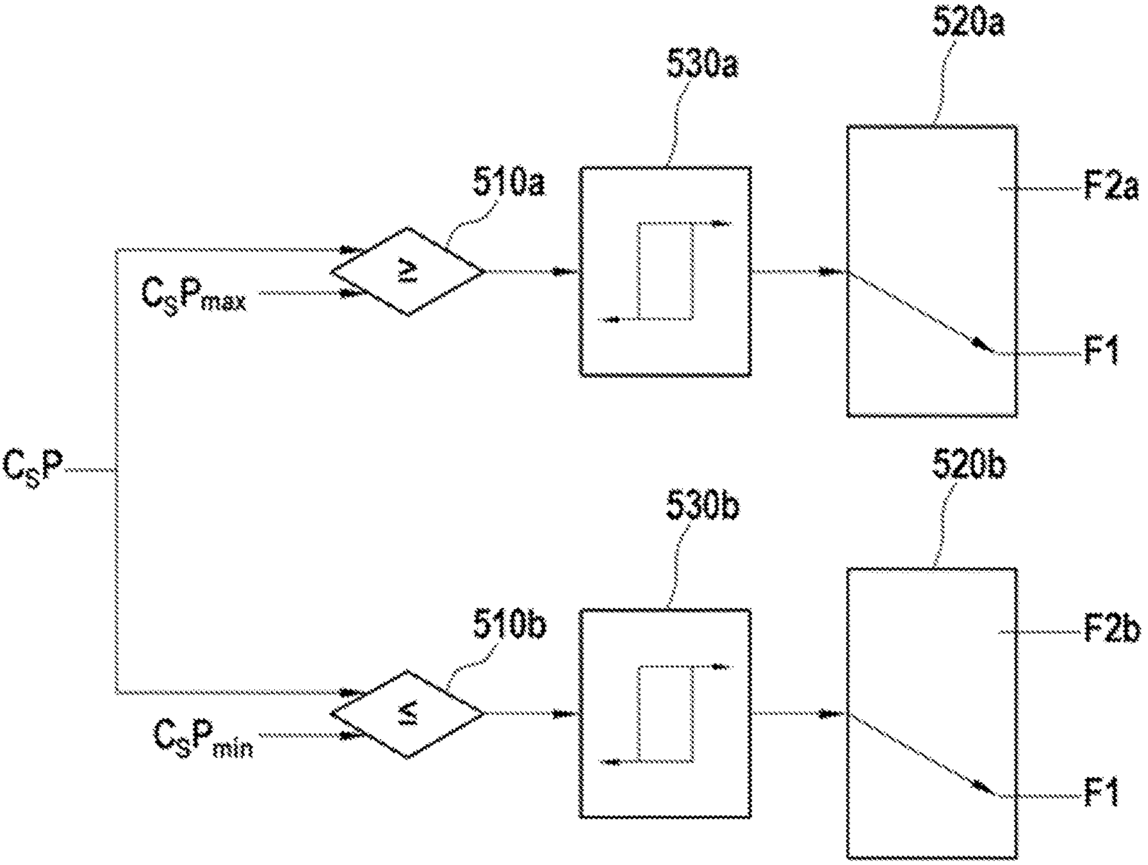

METHOD AND UNIT FOR CONTROLLING A MOTOR ASSEMBLY

CROSS-REFERENCE TO RELATED APPLICATIONS

This is a National Stage Application under 35 U.S.C. § 371 of International Application No. PCT/FR2023/050341, filed Mar. 14, 2023, now published as WO 2023/175270 A1, which claims priority to French Patent Application No. 2202270, filed on Mar. 15, 2022.

TECHNICAL FIELD

The present invention relates to the technical field of motor assemblies, and more particularly to aircraft motor assemblies comprising at least one electric machine and a gas turbine engine.

PRIOR ART

In the field of motor assemblies, and in particular motor assemblies incorporating gas turbine engines and used in aviation, a significant growth in mechanical power take-off for secondary purposes is being witnessed, and in particular for electrical generation. However, since the gas turbine engine is dimensioned according to the maximum propulsive and electrical energy demands, this can conflict with its economic operation.

In order to solve this problem, it was proposed in European patent application number EP 2 989 007 A1, during transitory steps of acceleration of the gas turbine engines of an aircraft, to temporarily reduce the mechanical power extracted by electrical generators which are mechanically coupled to these gas turbine engines, in order to offload them and thus facilitate their acceleration, and to increase the mechanical power extracted by the electrical generators during deceleration steps. By storing the excess electrical energy generated during the deceleration steps in order to cover any potential deficit in electrical energy during the acceleration steps, it may thus be possible to dimension the gas turbine engine more modestly, while covering the maximum requirements for mechanical power or thrust, and for electrical power.

However, gas turbine engines are also subject to other operational constraints, and this is also so in phases other than acceleration. The patent application publications US 2022/065176 A1 and EP 3 569 855 A1 have disclosed other operating methods for propulsive assemblies comprising gas turbine engines and electric machines.

DISCLOSURE OF THE INVENTION

The present disclosure aims to better adapt to the operational constraints for operating an aircraft motor assembly comprising a gas turbine engine and at least one electric machine mechanically coupled to a rotating shaft of the gas turbine engine so as to be rotated for generating electricity.

For this purpose, according to a first aspect of this disclosure, in a method for controlling such an aircraft motor assembly, a setpoint for mechanical power take-off by the electric machine can be changed when an operating parameter of the gas turbine engine reaches a predetermined limit.

Through this change in the setpoint for take-off of mechanical work by the electric machine, it is possible to avoid the operating parameter of the gas turbine engine departing from a preferred range, without affecting the propulsive power or thrust which are supplied to the aircraft.

The gas turbine engine may be a turbojet engine and, in particular, a turbofan engine. However, the application of this method is also possible with other types of aircraft gas turbine engine, such as turboprop engines used to drive at least one propulsive propeller or turboshaft engines used to drive at least one lift rotor.

Furthermore, this method is applicable to motor assemblies comprising a reducer connected to a rotating shaft of the gas turbine engine for driving of a mechanical member by the low-pressure shaft via the reducer, such as, for example, turbofan engines with reducer as well as the majority of turboprop engines and turboshaft engines.

Said operating parameter may be, in particular, a temperature inside the gas turbine engine, and its predetermined limit may be a maximum limit. In particular, the temperature may be a gas temperature in an exhaust nozzle of the gas turbine engine and the mechanical power take-off setpoint by the electric machine may be reduced when the temperature increases up to the maximum limit, so as to offload the gas turbine engine. Hence, in particular at a high speed of the gas turbine engine, such as may be reached, in particular, during aircraft take off, a temporary reduction in the mechanical power take-off by the electric machine can preserve the propulsive power supplied by the motor assembly to the aircraft, without the gas temperature at the exhaust becoming too high.

Alternatively, however, if the gas turbine engine comprises at least one low-pressure shaft with a low-pressure turbine, and a high-pressure shaft with a high-pressure turbine disposed upstream of the low-pressure turbine, and the electric machine is mechanically coupled to the high-pressure shaft, the temperature may be a combustion gas temperature at the outlet of the low-pressure turbine, and the setpoint for mechanical power take-off by the electric machine may be reduced when the temperature increases up to the maximum limit, so as to offload the high-pressure shaft. Hence, it may, in particular, be possible to avoid overheating of the turbines during an idling speed, which may, for example, be a speed at which the high-pressure shaft turns at a speed not greater than 40% of a nominal maximum speed. In this case, in order to at least partially compensate for the reduction in electrical power generated by the electric machine which is coupled to the high-pressure shaft, the motor assembly may also comprise an electric machine that is mechanically coupled to the low-pressure shaft, and a setpoint for mechanical power take-off by the electric machine mechanically coupled to the low-pressure shaft may be increased when the setpoint for mechanical power take-off by the electric machine mechanically coupled to the high-pressure shaft is reduced.

Alternatively however, at a temperature, said operating parameter may be a function of a flow rate of fuel supplied to a combustion chamber of the gas turbine engine, such as, for example, said flow rate of fuel divided by a static pressure at the inlet of the combustion chamber of the gas turbine engine, optionally normalised as a function of an intake temperature, and the setpoint for mechanical power take-off can be reduced when the operating parameter increases up to a maximum limit and/or increased when the operating parameter drops to a minimum limit. Hence, it is possible to obtain, in particular, faster increases in speed without respecting a maximum limit for the flow rate of fuel in order to avoid surge phenomena, in particular of a high-pressure compressor, and/or faster drops in speed while respecting a minimum limit of the flow rate of fuel in order to avoid extinguishing the combustion.

Said mechanical work may, in particular, be controlled in open loop. Alternatively, however, said mechanical work could be controlled in closed loop, in other words as a function of a feedback value.

A second aspect of this disclosure relates to a control unit of the above-mentioned motor assembly which may be adapted to control a change in a setpoint for mechanical power take-off by the electric machine when an operating parameter of the gas turbine engine reaches a predetermined limit.

A third aspect of this disclosure relates to a motor assembly comprising the control unit of the second aspect, as well as the electric machine and the gas turbine engine.

A fourth aspect of this disclosure relates to a computer program which may comprise instructions which, when implemented by a control unit of the above-mentioned hybrid motor assembly, leads the control unit to perform the method for controlling the first aspect.

BRIEF DESCRIPTION OF THE DRAWINGS

The object of the present disclosure and its advantages will be better understood on reading the following detailed description of embodiments presented by way of non-limiting examples. This description refers to the attached pages of figures, in which:

FIG. 1 is a schematic representation of a motor assembly according to the embodiments, comprising a gas turbine engine, two electric machines and a control unit.

FIG. 2 is a representation of an aircraft electrical network comprising two motor assemblies such as that of FIG. 1.

FIG. 3 is a diagram illustrating a method for controlling the motor assembly of the FIG. 1 according to a first and second embodiment.

FIG. 4 is a diagram illustrating a method for controlling the motor assembly of FIG. 1 according to a third embodiment.

DESCRIPTION OF THE EMBODIMENTS

As illustrated in FIG. 1, an aircraft motor assembly 100 according to an embodiment may comprise a gas turbine engine 200, a first electric machine 300, a second electric machine 400 and a control unit 500. The gas turbine engine 200 may comprise a low-pressure shaft 210 and a high-pressure shaft 220. The low-pressure shaft 210 and the high-pressure shaft 220 may be arranged coaxially, as illustrated. The gas turbine engine 200 may also comprise a low-pressure compressor 230, a high-pressure compressor 240, a combustion chamber 250, a high-pressure turbine 260, a low-pressure turbine 270, and an exhaust nozzle 275, arranged successively in the direction of flow in an annular stream of working fluid, so that the air taken in upstream of the low-pressure compressor 230 is successively compressed in the low-pressure compressor 230 and in the high-pressure compressor 240, in order to then generate, in the combustion chamber 250, hot combustion gases by combustion of a fuel injected into this combustion chamber 250. These combustion gases can then be successively expanded in the high-pressure turbine 260 and in the low-pressure turbine 270, so as to cause them to rotate, before escaping via the nozzle 275. The high-pressure shaft 220 may be mechanically coupled to the high-pressure turbine 260 and to the high-pressure compressor 240, such that the high-pressure turbine 260 can rotate the high-pressure shaft 220 and the high-pressure compressor 240, while the low-pressure shaft 210 may be mechanically coupled to the low-pressure turbine 270 and to the low-pressure compressor 230, such that the low-pressure turbine 270 can rotate the low-pressure shaft 210 and the low-pressure compressor 230.

As in the illustrated embodiment, the gas turbine engine 200 may be a turbofan engine also comprising a fan 280, which may also be mechanically coupled to the low-pressure shaft 230, so as to be able to also be rotated by the low-pressure turbine 270 via the low-pressure shaft 210. As illustrated, the gas turbine engine 200 could also comprise a reducer 290 interposed between the low-pressure shaft 210 and the fan 280, such that the fan 280 can be driven with a lower rotation speed than the low-pressure shaft 210. However, a fan directly driven by the low-pressure shaft 210 is also possible. Furthermore, other architectures of the gas turbine engine 200, without a fan, are also possible. Hence, the gas turbine engine 200 could alternatively be a turboprop engine, with at least one propulsive propeller mechanically coupled to the low-pressure shaft 210 via the reducer 290, or a turboshaft engine, with at least one lift rotor mechanically coupled to the low-pressure shaft 210 via the reducer 290. It is also possible, in particular for a turboshaft engine or a turboprop engine, that the gas turbine engine 200 comprises only a single compressor, mechanically coupled to the high-pressure shaft 210.

The first electric machine 300 may be, as illustrated, configured as a motor-generator for selectively transforming electrical energy into mechanical work in motor mode, and mechanical work into electrical energy in generator mode. This first electric machine 300 may be mechanically coupled to the low-pressure shaft 210 to actuate, in motor mode, the low-pressure shaft 210, and to be actuated, in generator mode, by the low-pressure shaft 210. However, it is also possible, in the context of the present disclosure, that it is only configured as an electric generator, only capable of transforming electrical energy into mechanical work.

Analogously, the second electric machine 400 may also be, as illustrated, designed as a motor-generator for selectively transforming electrical energy into mechanical work in motor mode, and mechanical work into electrical energy in generator mode. This second electric machine may be mechanically coupled to the high-pressure shaft 220 to actuate, in motor mode, the high-pressure shaft 220, and to be actuated, in generator mode, by the high-pressure shaft 220. However, it is also possible, in the context of the present disclosure, that it is only configured as an electric generator, only capable of transforming mechanical work into electrical energy.

As illustrated in FIG. 2, in an aircraft 10, which may be an aircraft 10 with one or more similar motor assemblies 100, each of the first and second electric machines 300, 400 of each motor assembly 100 may be electrically connected to an electrical network 20. This electrical network 20 may be a DC electrical network, and each of the first and second electric machines 300, 400 of each motor assembly 100 can then be electrically connected to the electrical network 20 via a corresponding converter 30. In order to supply power to this electrical network, the aircraft 10 may also include a fuel cell 50, an electrical energy storage device 60 (for example a battery and/or a supercapacitor) and/or an auxiliary generator set 40, which may include a generator 41 mechanically coupled to a combustion engine 42 for its actuation and be electrically connected to the electrical network 20 via another converter 30.

The control unit 500 may be an electronic control unit, optionally a Full Authority Digital Engine Control (FADEC). It may, in particular, take the form of an electronic processor that is able to implement the instructions of a computer program for controlling the operation of the motor assembly 100. This control unit 500 can be connected to the gas turbine engine 200 in order to control, in particular, the supply of the combustion chamber 250 with fuel, as well as to each of the first and second electric machines 300, 400 in order to control the injection and/or extraction of mechanical work from the low-pressure shaft 210 and from the high-pressure shaft 220, respectively. The control unit 500 may also be connected to a manual control, for example a throttle lever 80, and/or to a flight computer 90, in order to receive an operating instruction for the motor assembly 100, which may, for example, take the form of a thrust, power or rotation speed setpoint for the low-pressure shaft 210 and/or the high-pressure shaft 220. In the aircraft 10, the control unit 500 of each motor assembly 100 may furthermore also be connected to a control unit 70 of the electrical network 20, which may be connected in turn to each converter 30, to the electrical generating set 40, to the fuel cell 50 and/or to the electrical energy storage device 60, in order to maintain a balance in the electrical network 20. The control unit 500 may furthermore be connected to temperature sensors 276 and 277, disposed, respectively, directly downstream and upstream of the low-pressure turbine 270, in order to receive combustion gas temperatures at the outlet of the low-pressure turbine 270 and at the outlet of the high-pressure turbine 260, and to one or more pressure sensors (not illustrated), disposed in the combustion chamber 250 in order to detect a static pressure $p_{cc}$ at the inlet of the combustion chamber 250 and transmit it to the control unit 500, and to one or more flow rate sensors (not illustrated), disposed in a fuel supply circuit of the combustion chamber 250 in order to detect a flow rate C of fuel supplied to the combustion chamber 250 and to transmit it to the control unit 500, in particular as a feedback value for controlling this fuel supply.

In a first embodiment, the control unit 500 may be suitable for implementing a method for controlling the motor assembly 100, as illustrated in FIG. 3, wherein the combustion gas temperature $T_5$ at the outlet of the low-pressure turbine 270 is sensed and transmitted to the control unit 500 by the sensor 276 and compared with a maximum limit $T_{5,max}$ in a comparator functional block 510 of the control unit 500, in such a way that, when this temperature $T_5$ increases to reach the maximum limit $T_{5,max}$, in particular at an idling speed, a switch functional block 520 of the control unit 500 can change from a first operating mode F1 to a second operating mode F2, wherein a setpoint for mechanical power take-off $P_{HP}$ transmitted by the control unit 500 to the second electric machine 400 is reduced. It is possible that the temperature $T_5$ is not sensed, but calculated indirectly from other parameters before being compared with its maximum limit $T_{5,max}$ in the comparator functional block 510 of the control unit 500. In order to maintain the balance of the electrical network 20, the control unit 500 can control, simultaneously with this reduction in the power take-off by the second electric machine 400, an increase in the power taken-off by the first electric machine 300 on the low-pressure shaft 210. Hence, for example, it is possible to pass from a first mode F1, in which all of the required electrical power would be generated uniquely by the second electric machine 400, and the first electric machine 300 would take-off substantially lower power on the low-pressure shaft 210, to a second mode F2 in which the electrical generation would be shared, for example equally, between the first electric machine 300 and the second electric machine 400. Alternatively or in addition to the increase in the power taken-off by the first electric machine 300 on the low-pressure shaft 210, the control unit 500 can also control, via the control unit 70 of the electrical network 20, an additional electrical contribution by the auxiliary generator set 40, by the fuel cell 50 and/or by the electrical energy storage device 60, and/or a reduced electrical consumption by one or more consumers connected to the electrical network 20.

The reduction in the mechanical power take-off $P_{HP}$ by the second electric machine 400 may be controlled in closed loop, in particular as a function of a difference between the temperature $T_5$, thus used as feedback value, and its upper limit $T_{5,max}$. Alternatively, however, the reduction in the power take-off PHP could be controlled in open loop, with for example a predetermined reduction in the power take-off PHP for a predetermined time. The control of the reduction in the power take-off PHP could furthermore incorporate a hysteresis 530, so as to only stop when the temperature $T_5$ was substantially below its upper limit $T_{5,max}$.

In a second embodiment, the control unit 500 may be suitable for implementing a control method of the motor assembly 100, wherein the temperature $T_{EG}$ of the combustion gas at the outlet of the high-pressure turbine 260 is sensed (or calculated separately and transmitted to the control unit 500 by the sensor 277 in order to be compared with a maximum limit $T_{EG,max}$ in the comparator functional block 510 of the control unit 500, in such a way that, when this temperature $T_{EG}$ increases to reach the maximum limit $T_{EG,max}$, in particular at a take off speed of the aircraft, the switch functional block 520 of the control unit 500 can pass from the first operating mode F1 to a second operating mode F2', wherein a setpoint for mechanical power take-off $P_{BP}$ transmitted by the control unit 500 to the first electric machine 300 and/or a setpoint for mechanical power take-off $P_{HP}$ transmitted to the second electric machine 400 are reduced. It is also possible to use, instead of the temperature $T_{EG}$ of the combustion gas at the outlet of the high-pressure turbine 260, a temperature of the combustion gases still further upstream, in particular a temperature $T_{41}$ of the combustion gas at the inlet of the high-pressure turbine 260, in such a way that the setpoint $P_{BP}$ and/or the setpoint $P_{HP}$ are reduced when this temperature increases to reach a maximum limit, in particular at a take off speed of the aircraft. Both temperature $T_{EG}$ and temperature $T_{41}$ might not be directly sensed, but be indirectly calculated from other parameters before being compared with their corresponding limits in the comparator functional block 510 of the control unit 500. In order to maintain the balance of the electrical network 20, the control unit 500 can control, via the control unit 70 of the electrical network 20, an additional electrical contribution by the auxiliary generator set 40, by the fuel cell 50 and/or by the electrical energy storage device 60, and/or a reduced electrical consumption by one or more consumers (not illustrated) connected to the electrical network 20, which are not essential to flight safety. It is thus possible, for example, to pass from a first mode F1 in which all of a nominal electric power would be generated uniquely by the second electric machine 400, to a second mode F2' in which each of the first and second electric machines 300, 400 would generate 30% of the nominal electrical power, and the remaining deficit would be covered by reducing the electrical consumption and/or using the auxiliary generator set 40, the fuel cell 50 and/or the electrical energy storage device 60.

The reduction in the mechanical power take-off $P_{BP}$ and $P_{HP}$ by the first and second electric machines 300, 400 may be controlled in closed loop. Hence, at any time as long as the temperature $T_{EG}$ remains greater than or equal to the maximum limit $T_{EG,max}$, the control unit 500 could control the first and/or second electric machines 300, 400 to reduce the corresponding power take-off $P_{BP}$ or $P_{HP}$ as a function, for example, of a difference between the temperature $T_{EG}$, thus used as feedback value, and its upper limit $T_{EG,max}$. Alternatively, however, the reduction in the power take-off $P_{HP}$ and/or $P_{BP}$ could be controlled in open loop, with for example a predetermined reduction in the power take-off $P_{HP}$ and/or $P_{BP}$ for a predetermined time. The control of the reduction in the power take-off $P_{HP}$ and/or $P_{BP}$ could furthermore incorporate a hysteresis 530, so as to only stop when the temperature $T_{EG}$ was substantially below its upper limit $T_{EG,max}$.

In a third embodiment, the control unit 500 may be suitable for implementing a control method of the motor assembly 100, illustrated in FIG. 4, wherein the control unit 500 may calculate a ratio CsP which may be the flow rate C of fuel supplied to the combustion chamber 250 transmitted by at least one flow rate sensor, divided by the static pressure $p_{cc}$ transmitted by the at least one pressure sensor. This ratio CsP, optionally normalised as a function of an intake temperature, can be compared with an upper limit $CsP_{max}$ and/or with a lower limit $CsP_{min}$ in respective comparator functional blocks 510*a*, 510*b*, in particular during a deceleration phase of the speed of rotation of the high-pressure shaft 220.

When the ratio CsP increases to become equal to, or even greater than, the upper limit $CsP_{max}$, in particular during an acceleration phase in the speed of rotation of the high-pressure shaft 220, a first switch functional block 520*a* of the control unit 500 can pass from the first operating mode F1 to a second operating mode F2*a*, wherein the control unit 500 can be controlled to reduce the power take-off $P_{HP}$ taken by the second electric machine 400 on the high-pressure shaft 220, so as to offload the high-pressure shaft 220 and it can, in particular, continue to accelerate with the available fuel supply, expressed by the upper limit $CsP_{max}$. This reduction in the power take-off $P_{HP}$ can, in particular, be controlled in closed loop, in particular as a function of a difference between the ratio CsP, thus used as feedback value, and its upper limit $CsP_{max}$. Alternatively, however, the reduction in the power take-off $P_{HP}$ could be controlled in open loop, with for example a predetermined reduction in the power take-off $P_{HP}$ for a predetermined time. The control of the reduction in the power take-off $P_{HP}$ could furthermore incorporate a hysteresis 530*a*, so as to only stop when the ratio CsP was substantially below its upper limit $CsP_{max}$.

As in the first embodiment, in order to maintain the balance of the electrical network 20, the control unit 500 may control, simultaneously with this reduction in the power take-off $P_{HP}$ by the second electric machine 400, an increase in the power taken-off $P_{BP}$ by the first electric machine 300 on the low-pressure shaft 210. Alternatively or in addition to the increase in the power taken-off by the first electric machine 300 on the low-pressure shaft 210, the control unit 500 may also control, via the control unit 70 of the electrical network 20, an additional electrical contribution by the auxiliary generator set 40, by the fuel cell 50 and/or by the electrical energy storage device 60, and/or a reduced electrical consumption by one or more consumers (not illustrated) connected to the electrical network 20, which are not essential to flight safety. It is thus possible, for example, to pass from a first mode F1 in which all of a nominal electric power would be generated uniquely by the second electric machine 400, to a second mode F2*a* in which the second electric machine 300 would generate substantially no electrical power, the first electrical machine 300 would generate 80% of the nominal electrical power, and the remaining deficit would be covered by reducing the electrical consumption and/or using the auxiliary generator set 40, the fuel cell 50 and/or the electrical energy storage device 60.

On the other hand, when the ratio CsP increases to become equal to, or even less than, the lower limit $CsP_{min}$, in particular during a deceleration phase in the speed of rotation of the high-pressure shaft, a second switch functional block 520*b* of the control unit 500 may pass from the first operating mode F1 to a third operating mode F2*b*, in which the control unit 500 may be controlled to increase the power take-off $P_{HP}$ taken by the second electric machine 400 on the high-pressure shaft 220, so as to brake the high-pressure shaft and it may, in particular, continue to decelerate while avoiding extinction of the combustion chamber 250 through insufficient supply of fuel, due to the respect of the lower limit $CsP_{min}$. This increase in the power take-off $P_{HP}$ can, in particular, be controlled in closed loop, in particular as a function of a difference between the ratio CsP, thus used as feedback value, and its lower limit $CsP_{min}$. Alternatively, however, the increase in the power take-off $P_{HP}$ could be controlled in open loop, for example with a predetermined increase in the power take-off $P_{HP}$ for a predetermined time. The control of the increase in the power take-off $P_{HP}$ could furthermore incorporate a hysteresis 530*b*, so as to only stop when the ratio CsP was substantially above its lower limit $CsP_{min}$.

In order to maintain the balance of the electrical network 20 in this situation also, the control unit 500 may control, simultaneously with this increase in the power take-off $P_{HP}$ by the second electric machine 400, a reduction in the power $P_{BP}$ taken-off by the first electric machine 300 on the low-pressure shaft 210. Alternatively or in addition to the reduction in the power $P_{BP}$ taken-off by the first electric machine 300 on the low-pressure shaft 210, the control unit 500 may also control, via the control unit 70 of the electrical network 20, a reduction in the electrical contribution by the auxiliary generator set 40, by the fuel cell 50 and/or by the electrical energy storage device 60, and/or a larger electrical consumption by one or more consumers (not illustrated) connected to the electrical network 20, such as one or more de-icing devices. It would thus be possible, for example, to pass from a first mode F1 in which all of a nominal electrical power would be generated uniquely by the second electric machine 400, to a third mode F2*b* in which the second electric machine 400 would generate 120% of the nominal electrical power, and the excess would be consumed by the first electric machine 300 operating in motor mode, stored by the electrical energy storage device 60, and/or consumed by one or more electrical consumers, such as de-icing devices.

In a fourth embodiment, the nozzle 275 may be a nozzle with variable cross-section. In order to vary its output cross-section, it can include actuators 278 connected for control thereof to the control unit 500. In the case of reaching a limit output nozzle cross-section, the control unit 500 may control a reduction in the power take-off $P_{BP}$ taken by the first electric machine 300 on the high-pressure shaft 210, and/or of the power $P_{HP}$ taken by the second electric machine 400 on the high-pressure shaft 220, so as to offload the low-pressure shaft 210 and/or the high-pressure shaft 220. The reduction in the power take-off $P_{BP}$ and/or power take-off $P_{HP}$ could be controlled in open loop, with for example a predetermined reduction in the power take-off for a predetermined time. The control of the reduction in the power take-off could, furthermore, incorporate a hysteresis. In order to maintain the balance of the electrical network 20, the control unit 500 may control, via the control unit 70 of the electrical network 20, an additional electrical contribution by the auxiliary generator set 40, by the fuel cell 50 and/or by the electrical energy storage device 60, and/or a reduced electrical consumption by one or more consumers (not illustrated) connected to the electrical network 20, which are not essential to flight safety.

Although the present invention has been described by referring to specific embodiments, it is obvious that modifications and changes can be made to these examples without going beyond the general scope of the invention as defined by the claims. For example, in particular, the individual features of different embodiments illustrated or mentioned can be combined in additional embodiments. Consequently, the description and the drawings should be considered as illustrating rather than limiting.

The invention claimed is:

1. A control unit of an aircraft motor assembly, said motor assembly comprising a gas turbine engine and at least one electric machine which is mechanically coupled to a rotating shaft of the gas turbine engine so as to be rotated for generating electricity, the control unit configured to control an increase in a setpoint for mechanical power take-off by the electric machine when an operating parameter, which is a flow rate of fuel supplied to a combustion chamber of the gas turbine engine, divided by a static pressure at an inlet of the combustion chamber of the gas turbine engine, drops to a predetermined minimum limit.

2. The control unit according to claim 1, wherein the control unit is configured to control the increase in the setpoint for mechanical power take-off in closed loop as a function of a difference between the operating parameter and the predetermined minimum limit.

3. The control unit according to claim 1, wherein the control unit is configured to apply a hysteresis such that the increase in the setpoint for mechanical power take-off is maintained until the operating parameter rises above the predetermined minimum limit by a predetermined margin.

4. The control unit according to claim 1, wherein the at least one electric machine includes a first electric machine and a second electric machine, the second electric machine mechanically coupled to a second rotating shaft of the gas turbine engine, and wherein the control unit is further configured to control a reduction in a setpoint for mechanical power take-off by the second electric machine when the increase in the setpoint for mechanical power take-off by the electric machine is performed.

5. The control unit according to claim 1, wherein the control unit is configured to control the increase in the setpoint for mechanical power take-off during a deceleration phase of a high-pressure shaft of the gas turbine engine.

6. The control unit according to claim 1, wherein the control unit is configured to control the increase in the setpoint for mechanical power take-off in open loop by applying a predetermined increase for a predetermined time period.

7. The control unit according to claim 1, wherein the control unit is configured, simultaneously with the increase in the setpoint for mechanical power take-off, to control a reduction in electrical power supplied to an electrical network of the aircraft.

8. The control unit according to claim 1, wherein the control unit is configured, simultaneously with the increase in the setpoint for mechanical power take-off, to control storage of excess electrical energy in an electrical energy storage device of the aircraft.

9. The control unit according to claim 1, wherein the control unit is configured to compare the operating parameter with the predetermined minimum limit in a comparator functional block and to switch from a first operating mode to a second operating mode when the operating parameter reaches the predetermined minimum limit.

10. The control unit according to claim 1, wherein the control unit is configured to determine the operating parameter from signals provided by at least one fuel flow rate sensor and at least one pressure sensor disposed at the inlet of the combustion chamber.

11. The control unit according to claim 1, wherein the control unit is configured to increase the setpoint for mechanical power take-off so as to brake the rotating shaft and to continue deceleration of the gas turbine engine while avoiding extinction of combustion in the combustion chamber.

12. A method for controlling an aircraft motor assembly, said motor assembly comprising a gas turbine engine and at least one electric machine which is mechanically coupled to a rotating shaft of the gas turbine engine so as to be rotated for generating electricity, wherein a setpoint for mechanical power take-off by the electric machine is increased when an operating parameter, which is a flow rate of fuel supplied to a combustion chamber of the gas turbine engine, divided by a static pressure at an inlet of the combustion chamber of the gas turbine engine, drops to a predetermined minimum limit.

* * * * *